United States Patent [19]

Miller et al.

[11] Patent Number: 5,154,757
[45] Date of Patent: Oct. 13, 1992

[54] METHOD OF MAKING PURE COBALT METAL POWDER SUBSTANTIALLY FREE OF DIVALENT CATIONIC IMPURITIES

[75] Inventors: Michael J. Miller; Thomas A. Wolfe; Michael J. Cheresnowsky; Tai K. Kim, all of Towanda, Pa.

[73] Assignee: GTE Products Corporation, Stamford, Conn.

[21] Appl. No.: 783,752

[22] Filed: Oct. 28, 1991

[51] Int. Cl.$^5$ .......................... B22F 9/00; C22B 23/00
[52] U.S. Cl. ........................................ 75/365; 75/369; 75/371; 75/374; 423/139
[58] Field of Search ................. 75/365, 369, 371, 374; 423/139

[56] References Cited

U.S. PATENT DOCUMENTS

| | | | |
|---|---|---|---|
| 4,108,640 | 8/1978 | Wallace et al. | 423/139 |
| 4,469,505 | 8/1984 | Cheresnowsky et al. | 75/365 |
| 4,612,039 | 9/1986 | Scheithauer et al. | 75/365 |
| 4,705,559 | 11/1987 | Miller | 75/365 |

*Primary Examiner*—R. Dean
*Assistant Examiner*—Robert R. Koehler
*Attorney, Agent, or Firm*—Elizabeth A. Levy

[57] ABSTRACT

A method for producing pure cobalt metal powder involves the removal of divalent cationic impurities from a trivalent hexamine cobalt chloride solution. This solution is then decomposed to an insoluble cobalt oxide-containing material, from which pure cobalt metal powder is obtained through a chemical reduction process.

8 Claims, No Drawings

METHOD OF MAKING PURE COBALT METAL POWDER SUBSTANTIALLY FREE OF DIVALENT CATIONIC IMPURITIES

TECHNICAL FIELD

This invention relates to the production of pure cobalt metal powder from a hexammine cobalt (III) chloride solution. Pure cobalt metal powder may be used, for example, in the manufacture of cemented carbide cutting tools.

BACKGROUND OF THE INVENTION

The presence of impurities in pure cobalt metal powder may adversely affect the properties of items manufactured from the cobalt metal powder. Similarly, the presence of impurities in the cobalt-containing source materials from which the pure cobalt metal powder is obtained may adversely affect the powder manufacturing process. For example, the presence of impurities in the pure cobalt metal powder may decrease the strength and increase the porosity of articles made from the powder. Similarly, the presence of heavy metals, such as cadmium, in the cobalt-containing source materials may lead to a release of toxins harmful to those who handle the materials as well as to the environment. A "heavy metal" is defined as a metal having a specific gravity of 5.0 or greater, or whose density is at least five times that of water.

It would be advantageous to remove such potentially harmful impurities from the cobalt-containing source materials during the cobalt powder manufacturing process.

U.S. Pat. No. 4,612,039 to Scheithauer et al., the disclosure of which is hereby incorporated by reference, describes a method for producing pure cobalt metal powder in which a cobalt-containing source material is reduced to an intermediate cobalt metal, which is then oxidized in an ammoniacal ammonium halide solution in the presence of a catalyst. The product of the oxidation reaction is a solution containing hexammine cobalt (III) ions, to which a halide salt is added to form a hexammine cobalt (III) halide precipitate. The precipitate is dissolved in water, and the resulting solution is rendered basic and then heated to form an insoluble cobalt oxide-containing material. This material is then reduced to form pure cobalt metal powder.

SUMMARY OF THE INVENTION

It is an object of the invention to provide a method for making pure cobalt metal powder wherein divalent cationic impurities are substantially removed from a trivalent hexammine cobalt halide solution.

In accordance with the invention, there is provided a method of making pure cobalt metal powder, comprising the steps of: providing a source of cobalt-containing solids, wherein the cobalt-containing solids additionally contain cadmium, magnesium and/or calcium as divalent cationic impurities, processing the cobalt-containing solids so as to obtain a hexammine cobalt (III) chloride solution, passing the hexammine cobalt (III) chloride solution through a cation exchange resin to remove substantially all of the divalent cationic impurities, adjusting the pH of the hexammine cobalt (III) chloride solution to between 12.5 and 13, decomposing the hexammine cobalt (III) chloride solution to form an insoluble cobalt oxide-containing material, separating the insoluble cobalt oxide-containing material from the resulting solution, and reducing the insoluble cobalt oxide-containing material to pure cobalt metal powder.

DETAILED DESCRIPTION OF THE INVENTION

For a better understanding of the present invention, together with other and further objects, advantages, and capabilities thereof, reference is made to the following disclosure and appended claims in connection with the above description of some of the aspects of the invention.

The cobalt-containing solids which are used as the source material from which the pure cobalt metal powder is produced, may be scrap carbide articles, such as tungsten carbide mine tool or cutting tool bits, or scrap cobalt metal, or scrap cathode materials from electrowinning processes. These scrap materials may contain minor amounts of such heavy metals as nickel, chromium, iron and/or cadmium, as well as such impurities as calcium and/or magnesium. These heavy metals and impurities may be present as original constituents of the scrap materials, or they may be present as residues from mining or machining operations. Cadmium impurity levels may exceed 1000 ppm on a cobalt metal basis.

The cobalt-containing solids are digested in hydrochloric acid until the solids are dissolved. The concentration of the acid is not critical but should be at least 1 Molar and preferably 12 Molar. The result of this digestion process is a hydrated cobalt (II) chloride, $CoCl_2.6H_2O$.

The hydrated cobalt (II) chloride is contacted with an ammoniacal ammonium halide solution and a catalyst and is then oxidized to form a solution of hexammine cobalt (III) halide. The ammonium halide solution is preferably ammonium chloride. The catalyst is preferably activated carbon, for example, DARCO activated carbon, available from ICI Americas, Inc., Wilmington, DE.

The result of the oxidation reaction is a hexammine cobalt (III) halide solution, preferably hexammine cobalt (III) chloride. Crystals of the hexammine cobalt (III) halide are precipitated from the solution by the addition of hydrochloric acid, preferably 12 Molar, to increase the chloride ion concentration of the solution. These crystals contain the activated carbon catalyst, which is subsequently removed by dissolving the crystals in warm water and adjusting the pH of the aqueous solution to about 9.0 with a strong base, such as concentrated (19 Molar) sodium hydroxide. The solution is then filtered to remove the activated carbon, which is insoluble.

The hexammine cobalt (III) halide solution is then passed through a cation exchange resin in order to remove divalent cationic impurities. The ion exchange resin can be a column of macroporous polystyrene-based resin beads which have chelating iminodiacetate functional groups. Two suitable cation exchange resins are Lewatit TP-207, available from Mobay Chemical Corporation, Pittsburgh, PA, and Amberlite IRC-718, available from Rohm & Haas Company, Philadelphia, PA.

The ion exchange resin is typically supplied in the sodium form, that is, loaded with sodium ions ($Na^+$). Other forms which are usable for the method of this invention include the hydrogen ($H^+$), or proton, form and the ammonium ($NH_4^+$) form. The ammonium form is preferred because of its greater ion exchange efficiency.

For each divalent cation taken up by the resin during the cation exchange process, two monovalent cations are released from the resin into the hexammine cobalt (III) halide solution. The effluent from the resin column may be monitored by any method which allows a determination of the concentration of divalent cations therein, for example, atomic absorption spectroscopy, inductively-coupled plasma spectroscopy, or optical emission spectroscopy.

When the concentration of divalent cations in the effluent from the resin column begins to increase, the resin is fully loaded with divalent cations and cannot remove any more divalent cations from the solution. This phenomenon is known as "breakthrough." At breakthrough, the resin must be desorbed, or stripped, of the divalent cations and reloaded with monovalent cations so that it can be reused.

The cation exchange resin is desorbed of divalent cations in the following manner: deionized water is passed through the resin column until the effluent is clear. The hexammine cobalt (III) halide solution has an orange-red color and its presence in the resin column is easily detectable. The resin column is then stripped of the divalent metal cations by passing an acid solution through the resin. Hydrochloric acid is preferred in the treatment of hexammine cobalt (III) halide solutions. The concentration of the acid solution is not critical but is preferably 1-2 Molar. The effluent of this acid wash is monitored by any of the above-mentioned spectroscopic methods to determine the concentration of divalent cations in the acid. It has been determined that between 3 and 5 bed volumes of the acid are required in order to completely strip the resin column of divalent cations. A "bed volume" is that volume of solution that will fill up the resin column. This acid wash leaves the resin column in the proton, or hydrogen ion, form.

The resin column is then washed with deionized water until the pH of the effluent is neutral.

In order to restore the resin column to the ammonium form, an ammoniacal solution, such as ammonium hydroxide or ammonium chloride, is passed through the resin column. Ten bed volumes of the ammoniacal solution are recommended. The concentration of the ammoniacal solution is not critical but is preferably 1-2 Molar.

The purified hexammine cobalt (III) halide solution is then decomposed to an insoluble cobalt oxide-containing material. A strong base, such as concentrated (19 Molar) sodium hydroxide, is added to the hexammine cobalt (III) halide solution to increase the pH of the solution to between 12.5 and 13. The decomposition reaction takes place under atmospheric conditions at between 80° C. and 100° C. The resulting insoluble cobalt oxide-containing material is actually an amorphous solid containing both cobalt oxides and cobalt hydroxides. This insoluble material is then chemically reduced to form pure cobalt metal powder from which substantially all divalent cationic impurities have been removed.

The following non-limiting example is presented.

EXAMPLE

A cobalt chloride solution was obtained from the digestion in hydrochloric acid of scrap cobalt-containing tungsten carbide. Four hundred milliliters of the cobalt chloride solution were slowly added to 1000 milliliters of 14.5 Molar ammonium hydroxide (28% ammonia), available from HI-PURE Chemicals, Inc., Nazareth, PA. The temperature of this solution was maintained at below 25° C. To this solution were added 20 grams of DARCO activated carbon. Concentrated (12 Molar) hydrochloric acid was slowly added to this solution to adjust the pH to between 9.4 and 9.9. The temperature of the solution was then lowered to below 20° C. and the solution was oxidized for 5 hours by an aeration process in which a glass frit was purged with air. After the oxidation reaction, concentrated hydrochloric acid was added to the solution while maintaining the solution at a temperature of less than 25° C. to precipitate a hexammine cobalt (III) chloride complex. The acid was added until no more complex was precipitated. The solution was then filtered.

The filter cake, comprising crystals of hexammine cobalt (III) chloride and carbon, was dried at 110° C. The cake was slurry washed in 400 milliliters of 2 Molar hydrochloric acid and the slurry then filtered. The remaining solids, comprising crystals of hexammine cobalt (III) chloride and carbon, were then dissolved in 2.4 liters of deionized water by heating the solution to 40° C. Caustic (19 Molar) sodium hydroxide was added to the solution to adjust its pH to 9. The solution was then filtered to remove the insoluble sludge containing the activated carbon.

The resulting hexammine cobalt (III) chloride solution had a pH of 9.49 and the following starting concentrations of cobalt and impurities, respectively: 11 grams per liter cobalt, 14 milligrams per liter magnesium, 7.1 milligrams per liter calcium, and 8.4 milligrams per liter cadmium.

The ion exchange resin column contained a 25-milliliter bed volume of new Lewatit TP-207 resin in the ammonium ($NH_4^+$) form. A flow rate of 5 milliliters of solution per minute was used. One hundred forty bed volumes of the solution were passed through the resin column. A sample of the starting solution, the first five bed volumes collected, and every fifth bed volume thereafter were analyzed for cobalt, calcium, magnesium and cadmium concentrations.

After 140 bed volumes of the solution had been passed through the resin column, the resin was washed with deionized water at a flow rate of 2.5 milliliters per minute until the effluent was clear and all of the orange-red hexammine cobalt (III) chloride solution was removed from the resin. The column was then stripped with four bed volumes of 1 Molar hydrochloric acid at a flow rate of 2.5 milliliters per minute. The resin was again washed with deionized water until the effluent had a neutral pH.

Table I presents data from the analysis of the effluent samples. The column labeled "BV" indicates the number of bed volumes of solution passed through the resin. The first entry in that column, zero bed volumes, corresponds to the initial hexammine cobalt (III) chloride solution having the above-indicated concentrations of cobalt, calcium, magnesium and cadmium. The first five bed volumes reflect the amount of solution required to equilibrate the resin, that is, to purge it of deionized water and fill it with solution. Samples taken of every fifth bed volume thereafter through 140 bed volumes were reported in terms of the concentrations of cobalt, calcium, magnesium and cadmium, respectively, remaining in the effluent after passage through the resin.

The earliest breakthrough for these cationic impurities was seen with magnesium. At about 85 bed volumes of solution, the magnesium ion concentration in the effluent solution began to increase, indicating that the resin was fully loaded with magnesium ions. In practical applications, the resin is desorbed of its divalent cations and reconditioned when the magnesium concentration in the effluent solution reaches about 30 ppm.

TABLE I

REMOVAL OF CATIONIC IMPURITIES FROM Co(NH$_3$)$_6$Cl$_3$ SOLUTION

| BV | COBALT | CALCIUM | | MAGNESIUM | | CADMIUM | |
|---|---|---|---|---|---|---|---|
| 25 mL | g/L | mg/L | ppm | mg/L | ppm | mg/L | ppm |
| 0* | 11.00 | 7.10 | 645.50 | 14.00 | 1272.73 | 8.40 | 763.60 |
| 1 | 0.00 | 0.14 | 12.73 | 0.04 | 3.64 | 0.05 | 4.55 |
| 2 | 1.00 | 0.04 | 3.64 | 0.02 | 1.82 | 0.05 | 4.55 |
| 3 | 4.40 | 0.08 | 7.27 | 0.04 | 3.64 | 0.06 | 5.45 |
| 4 | 9.10 | 0.12 | 10.91 | 0.04 | 3.64 | 0.08 | 7.27 |
| 5 | 10.00 | 0.10 | 9.09 | 0.06 | 5.45 | 0.04 | 3.64 |
| 10 | 11.00 | 0.08 | 7.27 | 0.06 | 5.45 | 0.06 | 5.45 |
| 15 | 10.00 | 0.12 | 10.91 | 0.04 | 3.64 | 0.08 | 7.27 |
| 20 | 10.00 | 0.08 | 7.27 | 0.02 | 1.82 | 0.06 | 5.45 |
| 25 | 10.00 | 0.10 | 9.09 | 0.02 | 1.82 | 0.04 | 3.64 |
| 30 | 10.00 | 0.10 | 9.09 | 0.02 | 1.82 | 0.06 | 5.45 |
| 35 | 11.00 | 0.08 | 7.27 | 0.02 | 1.82 | 0.08 | 7.27 |
| 40 | 10.00 | 0.10 | 9.09 | 0.02 | 1.82 | 0.06 | 5.45 |
| 45 | 11.00 | 0.14 | 12.73 | 0.04 | 3.64 | 0.08 | 7.27 |
| 50 | 11.00 | 0.14 | 12.73 | 0.02 | 1.82 | 0.12 | 10.91 |
| 55 | 11.00 | 0.10 | 9.09 | 0.02 | 1.82 | 0.10 | 9.09 |
| 60 | 11.00 | 0.10 | 9.09 | 0.02 | 1.82 | 0.10 | 9.09 |
| 65 | 11.00 | 0.10 | 9.09 | 0.02 | 1.82 | 0.10 | 9.09 |
| 70 | 11.00 | 0.12 | 10.91 | 0.04 | 3.64 | 0.12 | 10.91 |
| 75 | 11.00 | 0.08 | 7.27 | 0.06 | 5.45 | 0.12 | 10.91 |
| 80 | 11.00 | 0.12 | 10.91 | 0.06 | 5.45 | 0.12 | 10.91 |
| 85 | 11.00 | 0.10 | 9.09 | 0.10 | 9.09 | 0.12 | 10.91 |
| 90 | 11.00 | 0.16 | 14.55 | 0.12 | 10.91 | 0.12 | 10.91 |
| 95 | 11.00 | 0.12 | 10.91 | 0.14 | 12.73 | 0.12 | 10.91 |
| 100 | 11.00 | 0.12 | 10.91 | 0.18 | 16.36 | 0.12 | 10.91 |
| 105 | 11.00 | 0.14 | 12.73 | 0.20 | 18.18 | 0.12 | 10.91 |
| 110 | 11.00 | 0.10 | 9.09 | 0.22 | 20.00 | 0.12 | 10.91 |
| 115 | 11.00 | 0.14 | 12.73 | 0.28 | 25.45 | 0.12 | 10.91 |
| 120 | 11.00 | 0.14 | 12.73 | 0.34 | 30.91 | 0.12 | 10.91 |
| 125 | 11.00 | 0.14 | 12.73 | 0.46 | 41.82 | 0.14 | 12.73 |
| 130 | 11.00 | 0.14 | 12.73 | 0.60 | 54.55 | 0.12 | 10.91 |
| 135 | 11.00 | 0.18 | 16.36 | 0.70 | 63.64 | 0.10 | 9.09 |
| 140 | 11.00 | 0.20 | 18.18 | 0.82 | 74.55 | 0.10 | 9.09 |
| $\bar{X}_{10-120}$ | 11.00 | 0.11 | 10.2 | 0.090 | 8.1 | 0.098 | 8.9 |
| % Removed | 0% Co | 98.5% Ca | | 99.4% Mg | | 98.8% Cd | |

*Starting solution

The concentrations of calcium, magnesium and cadmium at samplings 10 through 120 bed volumes were averaged ("$\bar{X}_{10-120}$" in Table I) to determine the average removal efficiency of the process for each cationic impurity until breakthrough occurred. The average concentration of cobalt remaining in the effluent was also computed to show that removal of cobalt (III) ions from the solution was insignificant.

While there has been shown and described what are at present considered the preferred embodiments of the invention, it will be obvious to those skilled in the art that various changes and modifications may be made therein without departing from the scope of the invention as defined by the appended claims.

What is claimed is:

1. A method of making pure cobalt metal powder, comprising the steps of: providing a source of cobalt-containing solids, wherein said cobalt-containing solids additionally contain cadmium, magnesium and/or calcium as divalent cationic impurities, processing said cobalt-containing solids so as to obtain a hexammine cobalt (III) chloride solution, passing said hexammine cobalt (III) chloride solution through a cation exchange resin to remove substantially all of said divalent cationic impurities, adjusting the pH of said hexammine cobalt (III) chloride solution to between 12.5 and 13, decomposing said hexammine cobalt (III) chloride solution to form an insoluble cobalt oxide-containing material, separating said insoluble cobalt oxide-containing material from the resulting solution, and reducing said insoluble cobalt oxide-containing material to pure cobalt metal powder.

2. The method of claim 1 wherein said cation exchange resin is a macroporous polystyrene-based cation exchange resin.

3. The method of claim 2 wherein said cation exchange resin is loaded with ammonium ions.

4. The method of claim 2 wherein said cation exchange resin is loaded with sodium ions.

5. The method of claim 2 wherein said cation exchange resin is loaded with hydrogen ions.

6. The method of claim 1 wherein said pH of said hexammine cobalt (III) chloride solution is adjusted with sodium hydroxide.

7. The method of claim 1 wherein said cobalt-containing solids are digested in hydrochloric acid to form cobalt (II) chloride.

8. The method of claim 7 wherein said cobalt (II) chloride is reacted with an ammoniacal ammonium chloride solution to form a hexammine cobalt (III) chloride solution.

* * * * *